United States Patent [19]
Villa-Aleman

[11] Patent Number: 5,505,829
[45] Date of Patent: Apr. 9, 1996

[54] MOLECULAR SEPARATION METHOD AND APPARATUS

[76] Inventor: Eliel Villa-Aleman, 3108 Roses Run, Aiken, S.C. 29803

[21] Appl. No.: 2,352

[22] Filed: Jan. 6, 1993

[51] Int. Cl.$^6$ .................................................. B01D 5/00
[52] U.S. Cl. ...................... 204/157.2; 422/186; 423/249; 96/108; 96/143
[58] Field of Search ............................ 204/157.2, 157.21; 422/186; 423/249, DIG. 7; 96/108, 143

[56] References Cited

U.S. PATENT DOCUMENTS

| | | | |
|---|---|---|---|
| 2,708,387 | 5/1955 | Broida et al. | 88/14 |
| 3,081,156 | 3/1963 | Orbach et al. | 23/210 |
| 3,126,267 | 3/1964 | Arend | 62/27 |
| 3,904,500 | 9/1975 | Jensen | 204/162 |
| 4,010,100 | 3/1977 | Suslick | 95/82 |
| 4,025,408 | 5/1977 | Marling | 204/163 |
| 4,101,396 | 7/1978 | Silfvast | 204/157 |
| 4,139,439 | 2/1979 | Manuccia et al. | 204/164 |
| 4,285,701 | 8/1981 | Schlenker | 55/17 |
| 4,332,775 | 6/1982 | Genequand et al. | 422/112 |
| 4,357,307 | 11/1982 | Horsley | 423/3 |
| 4,507,265 | 3/1985 | Higo et al. | 422/186 |
| 4,891,600 | 1/1990 | Cox | 328/233 |
| 4,976,938 | 12/1990 | Knize et al. | 423/249 |
| 4,996,033 | 2/1991 | Gardner-Chavis et al. | 423/249 |
| 5,093,086 | 3/1992 | Grossman et al. | 422/186 |

*Primary Examiner*—Ngoclan Mai
*Attorney, Agent, or Firm*—Harold M. Dixon; Brian R. Tumm; William R. Moser

[57] ABSTRACT

A method and apparatus for separating a gaseous mixture of chemically identical but physically different molecules based on their polarities. The gaseous mixture of molecules is introduced in discrete quantities into the proximal end of a porous glass molecular. The molecular sieve is exposed to microwaves to excite the molecules to a higher energy state from a lower energy state, those having a higher dipole moment being excited more than those with a lower energy state. The temperature of the sieve kept cold by a flow of liquid nitrogen through a cooling jacket so that the heat generated by the molecules colliding with the material is transferred away from the material. The molecules thus alternate between a higher energy state and a lower one, with the portion of molecules having the higher dipole moment favored over the others. The former portion can then be extracted separately from the distal end of the molecular sieve.

17 Claims, 2 Drawing Sheets

MOLECULAR SEPARATION METHOD AND APPARATUS

The U.S. Government has rights in this invention pursuant to Contract No. DE-AC09-89SR18035 between Westinghouse Savannah River Company and the U.S. Department of Energy.

BACKGROUND OF THE INVENTION

1. Field of the Invention

This invention relates to a method and apparatus for separating molecules. More particularly, the present invention is a method and apparatus for separating a gaseous mixture of different molecules based on their polarities.

2. Discussion of Background

Molecules may be separated from each other in a number of different ways, both chemically and physically. Typically, the separation technique selected can be a chemical one provided that the chemical characteristics are different. However, there are a number of situations where molecules are indistinguishable chemically but are in fact different physically and need to be separated. Examples of such molecular mixtures include diatomic combinations of the isotopes of hydrogen: protium, deuterium and tritium. Usually the physical differences are slight— perhaps amounting to a single neutron—and therefore the processes known for such separation are painstaking.

A molecule may have a transition dipole moment, if it is a polar molecule. The electrons of such a polar molecule occupy discrete energy levels, which depend on the energy of the molecule that change when the molecule gains or loses energy. The dipole moment of the molecule depends on the charge distribution associated with these electrons. Since the charge distribution will vary with absorbed energy, the transition dipole moment, the magnitude of the dipole moment will change accordingly. The dipole moment will also be different for each molecule because the energy states of molecules are affected by the presence of different numbers of nuclides in each molecular constituent.

Energy is absorbed by molecules in discrete amounts, or quanta, that are related to specific frequencies of electromagnetic energy; in other words, there are particular frequencies, "resonant" frequencies, of electromagnetic energy that are much more likely to be absorbed by particular molecules than other frequencies. Also, when molecular energy is radiated, rather than absorbed, by molecules, distinct energy quanta are emitted, quanta whose magnitude depends on the rotational energy level separations and dipole moments.

Conventional distillation is a process that consists of driving gas or vapor from liquids or solids by heating and condensing to liquid products and that is used for purification, fractionation, or the formation of new substances. The basic property which allows the separation of the constituents in a mixture is the boiling point of the components.

Selective laser-induced excitation is a process for separating a dissolved gas, such as deuterium or tritium, from water. Dissolved gas and water are heated into a vapor, mixed with ethylene, and simultaneously irradiated with light from two lasers. The lasers operate at different frequencies so as to selectively excite different molecular species while ignoring other species. Jenson in U.S. Pat. No. 3,904,500, describes operating a laser in the ultraviolet and infrared frequencies.

Microwave ovens have been used as energy sources to cook food, dry samples, react chemicals, etc. However, their industrial applications at the molecular level have not been fully realized.

It is clear that many techniques are available for separating hydrogen isotopes. However, there remains a need for a method and apparatus for separating hydrogen isotopes that is much more efficient.

SUMMARY OF THE INVENTION

This invention is a method and an apparatus for separating chemical species, particularly mixtures of chemically identical or substantially similar molecules having different dipole moments, such as, for example, mixtures of isotopes of hydrogen: protium, deuterium and tritium. The method comprises lowering the temperature of a porous material, the internal surface of which defines a partially closed space, then introducing the gaseous mixture into one end of the material while exposing the material to microwave energy. The microwaves excite the molecules to different extents based on their different dipole moments. The excited molecules move through the material, colliding with the surface of the material and giving up energy, are re-excited by the microwaves and continue thusly through the material to a distal end. Those molecular species having the highest dipole moments are favored in this process of absorption and desorption of energy to reach the distal end first. Preferably, the microwaves can be tuned to a resonant frequency of the higher dipole moment molecules to further favor that species. Also, by using a pump and pulsing valve, the mixture of molecules can be introduced in discrete quantities, each quantity separated from the other to minimize inter-molecular collisions.

The apparatus comprises the porous material that is a microwave-transparent material such as a molecular sieve made of porous glass, preferably a zerogel or aerogel or glass bead agglomeration, and in the form of a long tube in combination with a source of microwaves, preferably tunable. The apparatus also comprises a coolant and jacket surrounding the material for the coolant to flow through, picking up the heat from the inside of the material from the collisions of the molecules with the material surface. The apparatus also comprises a pump and a pulsing valve for urging the molecular mixture into and through the material.

An important feature of the present invention is the combination of the microwaves and the material on the molecules. The material acts as a guide and a means for repeatedly transferring heat from the molecules. The microwaves add energy to the molecules in such a way that those with higher dipole moments are favored in passing through the material. Each isotope within the gaseous mixture that has a transition dipole moment will absorb microwave radiation from the microwave source. Each molecule with a transition dipole moment will absorb an amount of radiation proportional the magnitude of the dipole moment and the wave function, which described mathematically the electronic distribution and excited rotational states. A non-polar molecular species in the gaseous mixture remains essentially unresponsive to the microwave energy.

If two or more chemical species having different transition dipole moments are present, then the different molecules will absorb microwave energy at different rates because of different rotational energy level separations and/or charge distributions. As a result of different absorption rates, each will flow along the length of the column at different rates. Hence a separation of the species having different transition dipole moments is possible.

Another important feature of the present invention is the combination of the material and the coolant. The material receives heat from collisions of the molecules; the coolant removes the deposited heat from the material. Since the coolant is preferably liquid nitrogen or other extremely cool liquid or gas, the material will absorb significant quantities of energy and not impart much energy of its own to the molecules. Furthermore, by absorbing significant energy from the molecules, they return to ground state or a low energy state where energy in the microwave energy excite them to levels where the dipole differences will be more pronounced. This assures that separation of molecules will take place efficiently and the materials of manageable dimensions can perform the needed separations.

The pulsing valve and pump are other features of the present invention. By injecting or introducing the mixture of molecules into one end of the material in discrete, small quantities rather than a continuous flow, the possibility of inter-molecular collisions is smaller and the probability of collisions with the material is higher. Since the material is both cooler and more massive, the transfer of energy as a result of a collision with the material is larger and the microwaves can then be more effective.

Still another important feature of the present invention is the source of microwaves itself. Preferably the source is tunable or specifically designed to produce microwaves having a resonant frequency of one of the molecular species. If so designed, that species will be favored over others that do not resonate with that frequency and the separation of molecules will be more efficient.

Other features and advantages will be apparent to those skilled in the art from a careful reading of the Detailed Description of a Preferred Embodiment presented below and accompanied by the drawings.

DETAILED DESCRIPTION OF PREFERRED EMBODIMENTS

The present invention is a method and apparatus for separating isotopes based on differences in their dipole moments and rotational energies. This invention is especially suited for mixtures of gaseous molecules where the constituents of the mixture are indistinguishable chemically but have different dipole moments. For example, a mixture of the isotopes of hydrogen: protium, deuterium and tritium can be separated using the present invention.

The heart of the invention is a molecular sieve. A molecular sieve is a material that has a substantial internal surface area because of its porosity. In the present invention, the sieve is made of a microwave-transparent material, such packed glass microbeads, an aerogel or a zerogel. Its pores are interconnected so that, when in the form of a rod or elongated, the sieve defines a path with a proximate end and a distal end. The molecules travel from the proximal to distal ends.

Surrounding the sieve is a jacket that carries a coolant to keep the sieve's internal surface temperature cold, establishing a heat gradient from inside the sieve to outside so that heat flows from inside the sieve to outside. The coolant is preferably liquid nitrogen.

A source of microwaves, preferably generated in a specific frequency range or tunable to within a specific frequency range, is directed toward the sieve. The frequency range is selected to be near the resonant frequency of those molecules with the greater dipole moments.

Molecules are pumped into the sieve. The microwaves penetrate the sieve and give more energy to the molecules with the greater dipole moments. The excited molecules collide with the cold inner surface, giving up energy, but are then re-excited by microwaves. With the assistance of the pump, the molecules travel from proximal to distal ends; the more active molecules are favored to reach the distal end first.

Figure 1:
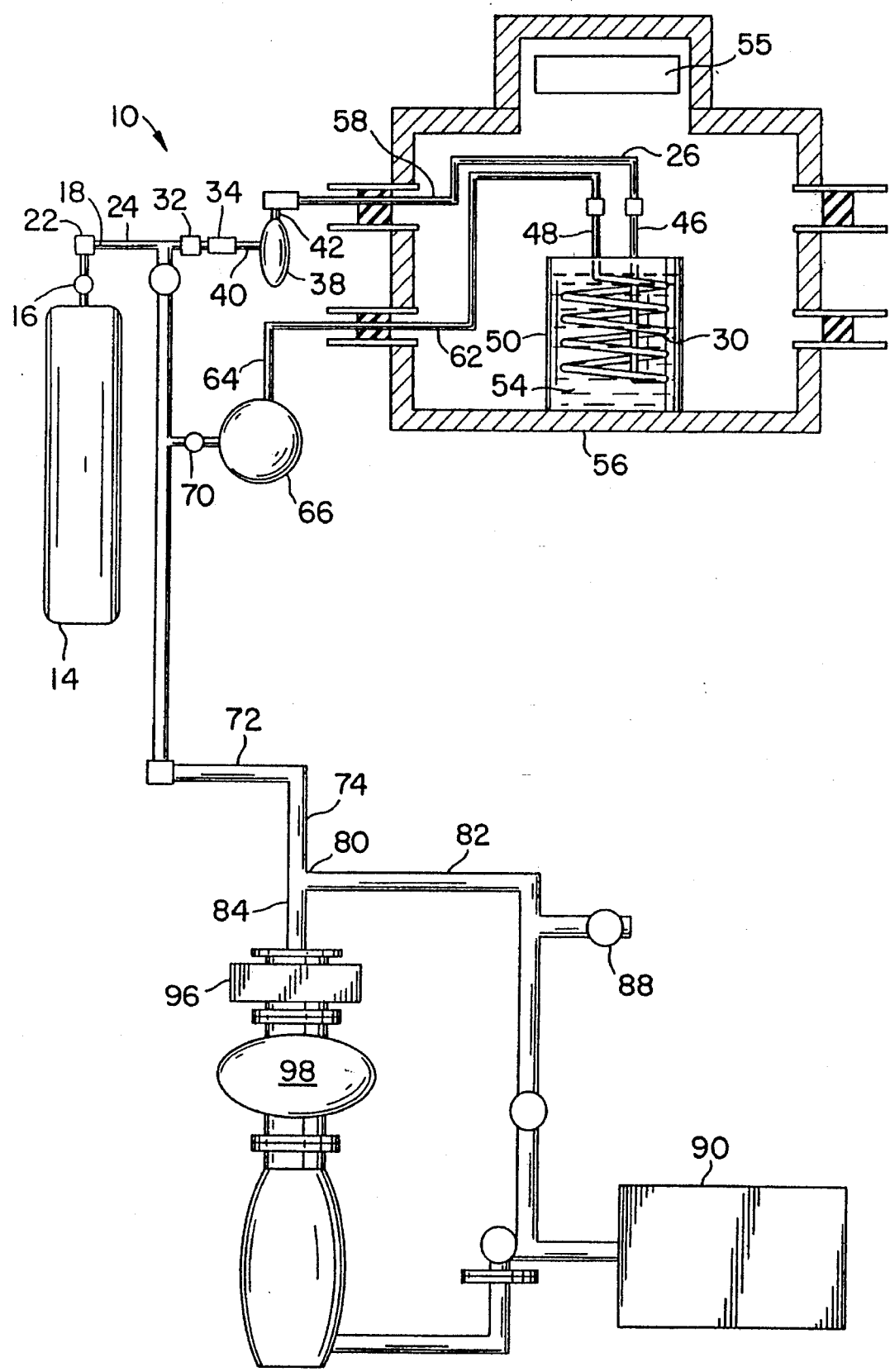
FIG. 1 is schematic illustration of a system according to a preferred embodiment of the present invention.

Referring now to FIG. 1, there is shown a schematic illustration of a system 10 according the preferred embodiment of the present invention. The gaseous mixture of less-polar and more polar molecular species intended for separation is contained in storage vessel 14. Storage vessel 14 is connected to a storage vessel control valve 16. Storage vessel control valve 16 is connected, in turn, to a molecular feed line 18 through a quick release valve 22 so that disconnection and replacement of storage vessel 14 is simplified. Storage vessel control valve 16 regulates the movement of gaseous mixture into molecular feed line 18.

In the preferred embodiment, the pressure of storage vessel 14 is higher than that of molecular feed line 18 so that a pressure differential is created across storage vessel control valve 16. When storage vessel control valve 16 is opened, the pressure differential drives the molecules from storage vessel 14 to molecular feed line 18.

Molecular feed line 18 is a conduit with a proximal end 24 and a distal end 26, made of a convenient material whose diameter and length may vary with system specifications, such as the molecular flow rate. The feed line provides a path through which molecules flow; the molecules enter proximal end 24 at storage vessel 14 and exit distal end 26 into a molecular sieve 30.

When storage control valve 16 is open, the molecular mixture flows from storage vessel 14 to a pulse valve 32. A "pulse valve" in the preferred embodiment is a timed regulating valve, opening and closing on cycles. Pulse valve 32 passes discrete, small quantifies of molecules downstream. The term "discrete quantities" means the amount or group of molecules separated from preceding and subsequent groups, like individual beads on a necklace. Pulse valve 32 in combination with the pressure differential across storage vessel 14 and molecular feed line 18 pumps discrete groups of molecules downstream.

While pulse valve 32 is closed, the pressure of molecular feed line 18 upstream of pulse valve 32 increases. As pulse valve 32 opens, the molecules pass through valve 32 along feed line 18 and into a series of impurity control traps. An "impurity control trap" absorbs water in order to remove it from the molecular mixture by obstructing flow, thus facilitating contact between the mixture and the walls of the trap. The walls of the trap absorb the water molecules but not free hydrogen.

The first impurity trap downstream of the pulse valve is a calcium chloride trap 34. $CaCl_2$ is a salt with a large water absorption capability. Water molecules, which are polar and therefore responsive to microwaves, must be substantially removed before the gaseous mixture reaches sieve 30 so that sieve 30 works properly.

The molecules exit $CaCl_2$ trap 34 and move to a liquid nitrogen trap 38. Liquid nitrogen trap 38 comprises an ellipsoid chamber with its major axis in the vertical position, a tube extending down the major axis of the ellipse, and a volume of liquid nitrogen. Liquid nitrogen trap 38 is preferably made of glass, having an inlet 40 and an outlet 42 and an upper and a lower portion. Inlet 40 is fixed near the upper portion of trap 38, and trap 38 is filled with a volume of liquid nitrogen so that the level of liquid is below that of inlet 40. A hollow tube extends from outlet 42 at the upper portion of trap 38 down through the central axis to the lower portion forming the exit channel.

The molecules flow into liquid nitrogen trap 38 and are forced to diffuse through a liquid nitrogen bath. Because the liquid nitrogen is very cold, the molecular mixture gives up thermal energy to the bath, thus lowering its temperature. The change in temperature causes the water molecules to change state, thereby enabling separation of them from the gaseous mixture. The gaseous, flow diffuses through the liquid nitrogen and into the hollow outlet channel tube. The molecular flow exits liquid nitrogen trap 38 and enters molecular sieve 30 through distal end 26 of feed line 18.

Molecular feed line 18 includes the "molecular sieve". The term "molecular sieve" means a highly porous material. The pores interconnect and define thereby a path with a convoluted surface. Sieve 30 is elongated to form a proximal end 46 and a distal end 48. Sieve 30 in the present invention is made of a microwave-transparent material, preferably a glass such as an aerogel, zerogel, or packed micro-beads. The surface is surrounded by a jacket 50 adapted for carrying a coolant 54. Coolant 54 is preferably liquid nitrogen or other extremely cold liquid or gas. In the preferred embodiment, sieve 30 is placed in a volume of liquid nitrogen.

Sieve 30 is in spaced relation to a source of microwaves 55. Preferably, sieve 30 passes through an enclosure where microwaves from a source can bombard sieve 30 without exposure of personnel. The term "microwaves" means a portion of the electromagnetic spectrum whose frequencies lie in the range from about 500 MHz to, perhaps, 300 GHz. The term "source" means a microwave generator, preferably one that is tunable or produces microwaves having a frequency in a selected range for energizing the polar molecules within the gaseous mixture with transition dipole moments. The preferred embodiment for hydrogen isotope separation uses a microwave source at 2450±13 MHz and 1600 W. The enclosure, in the preferred embodiment, can be a modified, commercially available microwave oven 56 having a molecular feed line inlet 58 and outlet 62.

The gaseous mixture comprises polar and non-polar molecules. A polar molecule has a characteristic transition dipole moment. The electrons surrounding the nucleus occupy discrete energy levels. Energy is absorbed by molecules in discrete amounts related to the differences between energy levels. When microwave energy is available at these resonant frequencies, nearly all of it can be absorbed so many more electrons can change levels per unit of energy output. Each molecule with a transition dipole moment will absorb an amount of radiation related to the magnitude of the dipole moment and the wave function, which describes mathematically the electron distribution and excited rotational states. The dipole moment depends on the charge distribution associated with the electron distribution, and the charge distribution varies with absorbed energy.

The molecules enter proximal end 46 of molecular sieve 30 in discrete, small quantities thereby lessening the possibility of intermolecular collisions and furthering the probability of collisions with the inner surface. The flow moves along the inner surface of sieve 30 urged from proximal end 46 to distal end 48 by the pumping of molecular feed line 18. The molecules collide with the surface, which absorbs a portion of the molecular energy deposited by the collision. Coolant 54, which is very cold, assures that the molecules give up most of their energy of excitement so that they are then in a ground state or near-ground state where microwave energy will be more effective in favoring those with greater dipole moments.

The microwaves continuously bombard the molecules. A polar molecule, moving in the molecular flow, absorbs the microwave energy, becomes excited, and radiates this energy when colliding with the inner surface whereupon a portion of its energy is transferred to the surface. Because the inner surface is very cold, the transfer of energy as a result of a collision is large. The dipole moment molecule continues to absorb microwave radiation and to radiate that energy through the inner surface contact.

Microwave radiation excites the molecules to levels where the dipole differences will be more pronounced. If two or more chemical species having different transition dipole moments are present, then the molecules will absorb microwave energy at different rates according to their rotational energy levels and charge distributions. The dipole moment will also be different for each molecule because the energy states of molecules are affected by the presence of different numbers of nuclides in each molecular constituent. A non-polar molecular species in the gaseous mixture remains essentially unresponsive to the microwave energy.

The inner surface, in combination with the microwave energy deposition on the molecules and the pulsed pumping of molecules into sieve 30, conducts the molecules along the length of sieve 30 toward distal end 48. The more polar molecules absorb more microwave energy and thus move faster than those without polar moments or with small polar moments.

The most microwave-responsive molecules exit distal end 48 of sieve 30 first and enter a molecular analyzer line 64. Molecular analyzer line 64 leads the molecules into a molecular analyzer 66.

The "molecular analyzer" is a device capable of identifying and determining molecular composition. Analyzer 66 is preferably a commercially available mass spectrometer. Molecular analyzer 66 connects to an analyzer control valve 70 that controls the movement of the molecules from molecular analyzer 66 to a molecular product line 72.

When open, analyzer control valve 70 allows molecules to flow into molecular product line 72. Molecular product line 72 is a conduit having a proximal end 74, a T-fitting 80, a re-separation end 82 and a product storage end 84. The molecules flow from analyzer control valve 70 to molecular product line 72. T-fitting 80 provides a juncture that allows the molecular flow to return to the molecular feed line 18 for re-separation or flow to the product storage. If a molecular re-separation valve 88 is closed while a pumping means 90 and pulse valve 32 are moving molecules to molecular sieve 30, then the molecules can continue to product storage end 84.

The molecules move through an open product storage gate valve 96 to a cold trap 98 which collects molecular species. A "cold trap" captures the separated molecules according to species.

Figure 2:
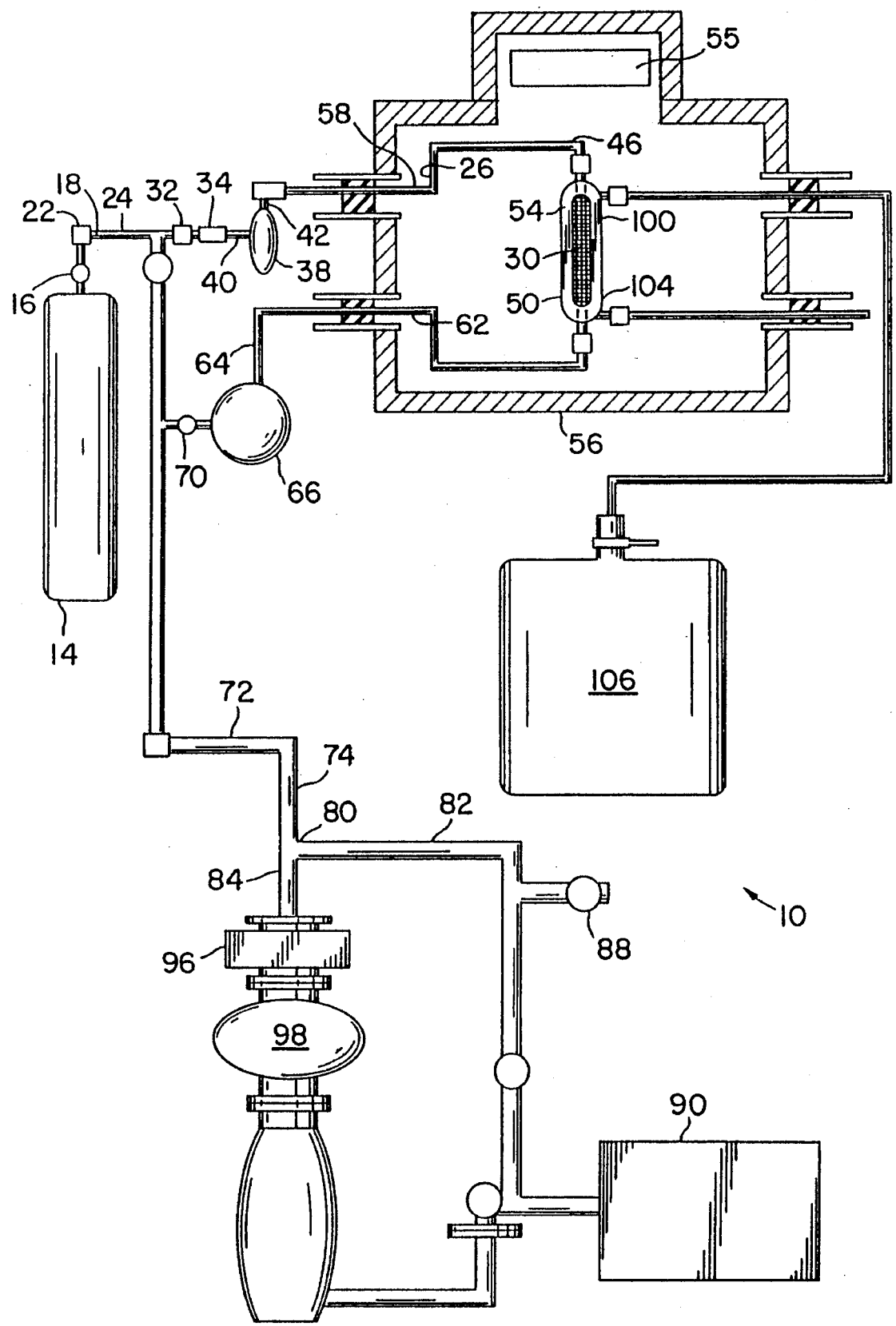
FIG. 2 is a schematic illustration of a system according to an alternative embodiment of the present invention.

Referring now to FIG. 2, there is shown a schematic illustration of a system according to an alternative embodiment of the present invention. The alternative embodiment has similar components to the preferred embodiment previously described and illustrated in FIG. 1, and, for clarity, matching components are identified with the same marking as the preferred embodiment.

As in the preferred embodiment, the gaseous mixture of less-polar and more polar molecular species intended for separation is contained in storage vessel 14 that is connected to storage vessel control valve 16. Storage vessel control valve 16 regulates the flow of gaseous mixture into molecular feed line 18, which can be adjusted so as to allow more or less flow into the system.

The molecular mixture flows from storage vessel 14 through pulse valve 32. As pulse valve 32 opens, the molecules pass to $CaCl_2$ impurity control trap 34. The molecules exit $CaCl_2$ trap 34 and enter liquid nitrogen trap 38. The molecular flow exits liquid nitrogen trap 38 and enters molecular sieve 30.

Molecular feed line 18 connects into molecular sieve 30, again a microwave-transparent material having an inner, partially closed surface defined by its highly porous structure which defines a path, and an outer surface that is kept chilled.

The surface is surrounded by a jacket 50 adapted for carrying a coolant 54. Jacket 50 in the alternative embodiment has an upper portion 100 and a lower portion 104. Coolant 54 continuously enters jacket 50 near upper portion 100 and exits jacket 50 near lower portion 104. The source of coolant 54 in the alternative embodiment is a liquid nitrogen cylinder 106.

Sieve 30 is, as in the preferred embodiment, in spaced relation to a source of microwaves 55. Preferably, sieve 30 passes through an enclosure where microwaves from Source 55 can bombard sieve 30 without exposure of personnel. The alternative embodiment for hydrogen isotope separation uses the same type of microwave source as described above.

The molecules flow into proximal end 46 of molecular sieve 30 in discrete, small quantities, flowing along the inside surface of 30 sieve under pressure from the pump as before.

It will be apparent that many changes and modifications can be made to the foregoing preferred embodiment without departing from the spirit and scope of the present invention which is defined by the appended claims.

What is claimed is:

1. An apparatus for separating molecules in a flow of molecules into a first portion and a second portion, said first portion having a higher dipole moment than said second portion, said apparatus comprising:

a material having a multiplicity of pores and an internal surface defined by said pores, and an external surface, said molecules being injected into said pores of said material and flowing through said material;

means in thermal communication with said material for transferring heat from said internal surface to said external surface so that when said molecules collide with and give up energy to said internal surface, said energy is transferred from said internal surface to said external surface; and a source of microwaves having a frequency range, said microwaves energizing said first portion of said molecules more than said second portion of said molecules, said microwaves being directed by said source toward said material so that molecules flowing though said material absorb microwave energy, said first portion absorbing more microwave energy and thereby moving faster than said second portion, said molecules colliding with said internal surface and giving up said microwave energy to said internal surface, said molecules repeatedly absorbing microwaves and giving up energy to said internal surface while moving through said material, said first portion moving faster than said second portion whereby said first portion separates from said second portion.

2. The apparatus as recited in claim 1, wherein said internal surface defines a path along said surface, said path having a proximal end and a distal end, said molecules flowing from said proximal end to said distal end along said path, said apparatus further comprising means for collecting said separated first and second portions.

3. The apparatus as recited in claim 1, wherein said transferring means is a flow of coolant over said external surface, said coolant being at a temperature lower than the temperature of said internal surface so that heat flows from said internal surface to said external surface.

4. The apparatus as recited in claim 1, wherein said transferring means is a flow of liquid nitrogen over said external surface so that heat flows from said internal surface to said external surface.

5. The apparatus as recited in claim 1, wherein said internal surface defines a path and wherein said transferring means is a flow of coolant over external surface, said coolant being at a temperature lower than the temperature of said internal surface so that heat flows from said internal surface to said external surface.

6. The apparatus as recited in claim 1, further comprising a pump for pumping said molecules into said material in discrete quantifies, each quantity separated from the other.

7. The apparatus as recited in claim 1, wherein said source of microwaves produces microwaves having frequencies near a resonant frequency of said molecules of said first portion.

8. An apparatus for separating molecules into a first portion and a second portion, said molecules of said first portion having a higher dipole moment than said molecules of said second portion of said molecules, said apparatus comprising:

a material having a multiplicity of pores, said material having an internal surface defined by said pores and an external surface, a proximal end and a distal end;

means for pumping said molecules from said proximal end to said distal end of said material;

means in thermal communication with said external surface for cooling said internal surface by transferring heat from said internal surface to said external surface so that when said molecules collide with and give up energy to said internal surface, said energy is transferred from said internal surface to said external surface by said cooling means;

a source of microwaves having a frequency range, said range selected for energizing said first portion of said molecules more than said second portion of said molecules, said microwaves being directed toward said material whereby said first portion will absorb more microwave energy and move faster than said second portion and whereby said molecules will collide with said internal surface and give up said energy to said internal surface, said molecules repeatedly absorbing microwaves and giving up energy to said internal surface while moving through said material, said first portion moving faster than said second portion whereby said first portion is separated from said second portion; and means for collecting said first portion and said second portion.

9. The apparatus as recited in claim 8, wherein said pumping means pumps said molecules into said proximal end of said material in discrete quantities so that each discrete quantity is separated from other discrete quantities.

10. The apparatus as recited in claim 8, wherein said cooling means is a flow of coolant over said external surface so that heat flows from said internal to said external surface.

11. The apparatus as recited in claim 8, wherein material is made of a porous glass.

12. The apparatus as recited in claim 8, wherein said cooling means further comprises a jacket surrounding said material, said jacket adapted for carrying a coolant.

13. A method for separating molecules having different dipole moments into a first portion and a second portion, said method comprising:

pumping said molecules through a material having a multiplicity of pores;

transferring heat from said material, said heat deposited by said molecules colliding with said material, so that said molecules periodically return to said lower energy state from said higher energy state; and exposing said material to microwaves so that said molecules are energized by said microwaves to a higher energy state from a lower energy state, said first portion being energized more than said second portion and moving through said porous material faster than said second portion whereby said first portion exits said material before said second portion.

14. The method as recited in claim 13, wherein said pumping step further comprises pumping said molecules into said porous material in discrete quantities so that each discrete quantity is separated from other discrete quantities.

15. The method as recited in claim 13, further comprising the step of tuning said microwaves to a frequency range that includes frequencies resonant with said first portion of said molecules.

16. The method as recited in claim 13, further comprising extracting said first portion of said molecules separate from said second portion as said molecules exit said material.

17. The apparatus as recited in claim 10, wherein said coolant is liquid nitrogen.

* * * * *